Patented Jan. 10, 1933

1,893,586

UNITED STATES PATENT OFFICE

GEORGE FREDERICK HORSLEY, OF NORTON UPON TEES, ENGLAND, ASSIGNOR TO IMPERIAL CHEMICAL INDUSTRIES LIMITED, A CORPORATION OF GREAT BRITAIN

PROCESS FOR INCREASING THE ETHYLENE CONTENT OF ETHYLENE CONTAINING GASEOUS MIXTURES

No Drawing. Application filed March 17, 1932, Serial No. 599,601, and in Great Britain March 12, 1931.

This invention relates to the manufacture and production of ethyl alcohol from ethylene, and in particular from gases containing ethylene together with higher olefines.

In the known process for preparing ethyl alcohol by hydrating ethylene either with the aid of sulfuric acid or by treatment with steam at an elevated temperature and preferably under pressure, in the presence of a dehydrating catalyst, in order to obtain a pure product it is necessary to purify the ethylene from the higher olefines which are usually present in commercial sources of ethylene, e. g., oil gas. Such higher olefines in the presence of dehydrating catalysts tend to condense to give hydrocarbons which are troublesome to remove from the product, and in the case where sulfuric acid is employed, the acid becomes fouled.

I have now found that a satisfactory purification of crude ethylene-containing gases may be effected by passing such gases over a catalyst comprising a metallic salt of a phosphoric acid at a raised temperature. By this treatment, unsaturated hydrocarbons other than ethylene, contained in the gaseous mixture including propylene and higher olefines are caused to condense or polymerize to give hydrocarbons of higher molecular weight which are liquid at the ordinary temperature. A crude ethylene-containing gas mixture, after treatment in this manner and after separation of the liquid hydrocarbons, may be catalyzed with steam to yield ethyl alcohol of satisfactory purity. If desired, part of the propylene and higher olefines may be condensed or polymerized as described, e. g., by a single passage of the initial gases over the catalyst, and the remainder removed by another suitable treatment, e. g., by washing the gas with a mineral oil fraction approximating to kerosene and boiling above 200° C., or by washing the gas with a solution of an ammoniacal cuprous salt such as formate, acetate, or carbonate.

According to the invention, therefore, crude ethylene-containing gases containing propylene and/or higher olefines, are enriched in ethylene for hydrating to alcohols or for any other use by passing at a raised temperature, if desired under pressure, over a catalyst comprising a metallic salt of a phosphoric acid, preferably a cadmium phosphate, e. g., cadmium meta phosphate, whereby part or all of the propylene and/or higher olefines are converted into condensible hydrocarbons, after the removal of which the gaseous mixture, if necessary after further purification from propylene and/or higher olefines in the case where some of these still remain in the gas, may be hydrated to yield ethyl alcohol of satisfactory purity, or utilized for any other purpose.

The temperature in the first, or purification catalysis, is preferably 150°–200° C. but may be as high as 300° C., and the process may be conducted preferably at either atmospheric or superatmospheric pressures up to 50 atmospheres, altho pressures of 125 atmospheres or more may be used, the pressure employed in this stage being, if desired, the same as that employed in the subsequent hydration of the ethylene. Altho metallic salts of phosphoric acids in general may be employed in the first stage of the process, I have found that a particularly suitable catalyst is cadmium meta phosphate, which is preferably prepared by adding an amount of cadmium oxide to a 50 per cent solution of orthophosphoric acid, corresponding to the equation:

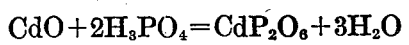

$$CdO + 2H_3PO_4 = CdP_2O_6 + 3H_2O$$

The oxide is added and after its addition the solution is evaporated to dryness, when pure granules of cadmium meta phosphate are obtained. The catalyst may be employed in this form or deposited on pumice or other suitable support.

I will now describe one mode of carrying out my process, but it will be understood that my invention is not limited by the details described.

Example

A mixture consisting of 67 per cent by volume of propylene, 25 per cent ethylene and 8.0 per cent of inert gases was passed at a rate of 12 liters per hour over a catalyst consisting of 150 cc. of cadmium meta phosphate, prepared in the manner described above, under atmospheric pressure and at a temperature of 200° C. Forty-five per cent of the propylene was condensed to a mobile oil, none of the ethylene present being condensed in this way, and the residual gas mixture contained 53 per cent by volume of propylene and 36 per cent ethylene. This gas mixture was recirculated over the catalyst until the propylene content was negligible and was then passed to a reaction chamber in which the ethylene was hydrated to ethyl alcohol.

By working under pressure in the above example substantially complete removal of the propylene may be effected in a single passage over the catalyst.

I claim:

1. A process for treating an ethylene-containing gaseous mixture to enrich the ethylene content thereof, which comprises passing said gaseous mixture at a temperature from 150° C. to 300° C. over a catalyst comprising essentially a cadmium salt of a phosphoric acid, whereby at least part of the higher olefines is converted into condensible hydrocarbons.

2. A process for treating an ethylene-containing gaseous mixture to enrich the ethylene content thereof, which comprises passing said gaseous mixture at a temperature from 150° C. to 300° C. over a catalyst comprising essentially a cadmium salt of a phosphoric acid, whereby at least part of the higher olefines is converted into condensible hydrocarbons, then washing the gas by passing it in contact with a solvent for the condensible hydrocarbons.

3. The process of claim 1 in which the reaction is carried on under superatmospheric pressure.

4. The process of claim 1 in which the reaction is effected at a temperature of 150° C. to 200° C.

5. The process of claim 1 in which the catalyst comprises essentially a cadmium phosphate.

6. The process of claim 1 in which the catalyst comprises essentially cadmium meta phosphate.

In testimony whereof I affix my signature.

GEORGE FREDERICK HORSLEY.